(12) United States Patent
Hines et al.

(10) Patent No.: US 6,954,528 B2
(45) Date of Patent: Oct. 11, 2005

(54) MESSAGE PATH BYPASS FOR INTELLIGENT NETWORK ELEMENTS

(75) Inventors: Warner Lee Hines, Southlake, TX (US); Robert L. Reeves, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/034,898

(22) Filed: Dec. 28, 2001

(65) Prior Publication Data

US 2003/0123633 A1 Jul. 3, 2003

(51) Int. Cl.[7] ............................................... H04M 7/00
(52) U.S. Cl. ........................... 379/221.08; 379/221.09; 379/221.1; 379/221.11; 379/221.12; 379/229; 379/230
(58) Field of Search ....................... 379/221.08, 221.09, 379/221.1, 221.11, 221.12, 229, 230

(56) References Cited

U.S. PATENT DOCUMENTS 6,744,880 B1 * 6/2004 Jones et al. .................. 379/268

2001/0046856 A1 * 11/2001 McCann
2003/0100319 A1 * 5/2003 Contractor

* cited by examiner

Primary Examiner—Ahmad F. Matar
Assistant Examiner—Quynh H. Nguyen

(57) ABSTRACT

A PSTN service control point including multiple subsystems, a memory storing inbound SS7 messages and a SS7 module which internally routes outbound messages directed to the same point code. On receipt of an inbound SS7 message, a SS7 controller stores the complete message in the memory. The SS7 module routes the message to a first subsystem which processes the message and adds new information to the stored message in memory. If the first subsystem needs to collaborate with a second subsystem, it routes the SS7 message through the SS7 module which checks the outgoing message point code. If the destination point code matches the first subsystem point code, the SS7 module treats the message as an inbound message and routes it internally to the second subsystem.

16 Claims, 2 Drawing Sheets

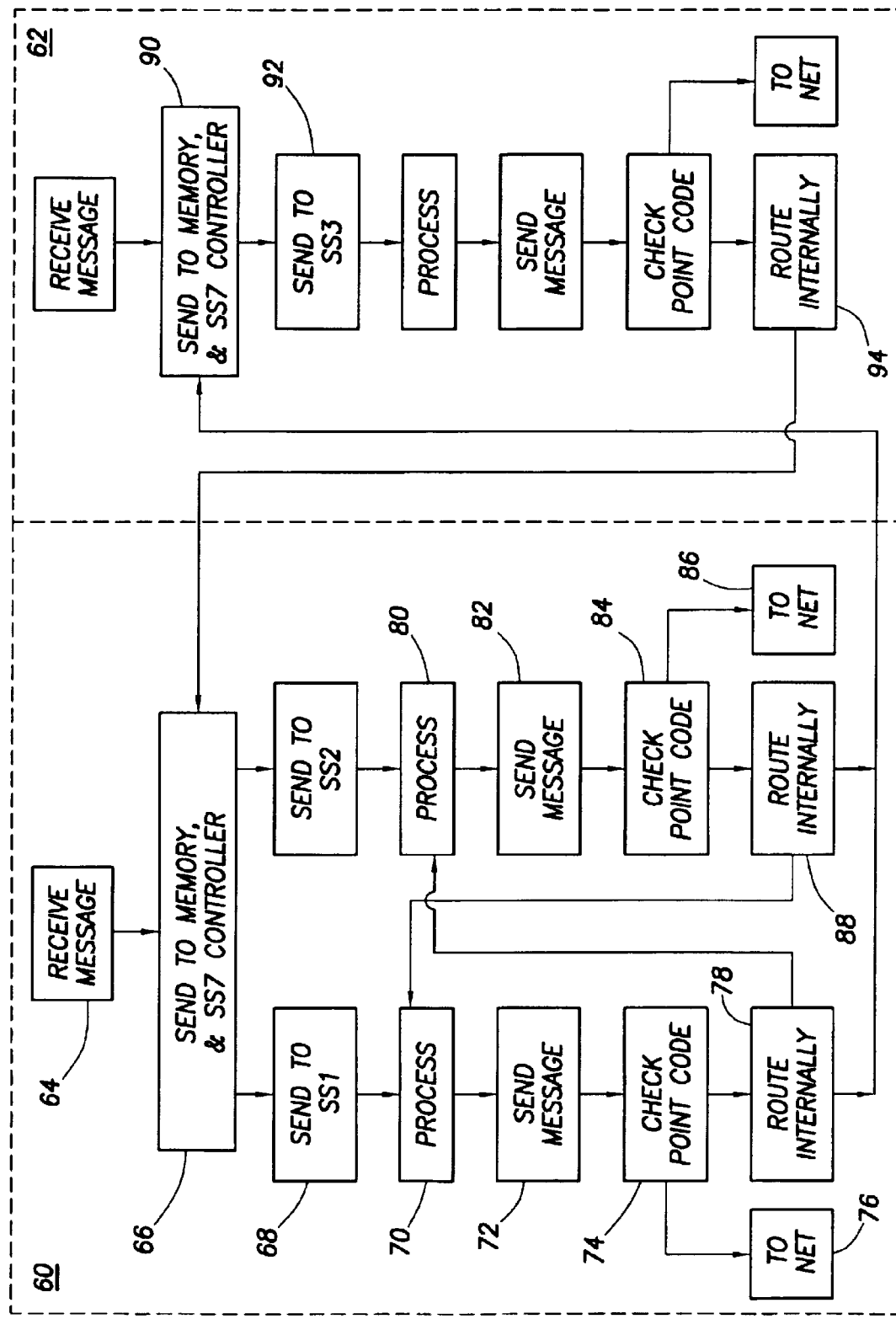

MESSAGE PATH BYPASS FOR INTELLIGENT NETWORK ELEMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the public switched telephone network signaling system seven, SS7 and more particularly to a system and method for bypassing the SS7 network when forwarding SS7 messages between subsystems located at the same signaling control point.

2. Background of the Invention

The public switched telephone network, or PSTN, as we know it today was developed to allow telephone calls to be made to and from points anywhere in the world. To make this possible, standards had to be developed. One of the most important was the signaling system seven, or SS7 which controls the signaling needed to set up calls. The SS7 standard was originally developed to allow signaling for large numbers of calls to be sent over a small number of telephone lines, thereby reserving more lines for the voice connections. However, the SS7 standard has facilitated the development of many other functions on the PSTN, such as 800 service, 900 service, 911 service, mobile telephone service, and position determination service for mobile telephones.

The original PSTN with the SS7 was centered around telephone switches. The switches were essentially hardwired systems which used the signaling information from the SS7 system to build the connections between two or more telephone sets. The switches were not well suited for "non-standard" functions such as 800 service and were difficult to modify.

The inflexibility of the SS7 switches was addressed by adding service control points, SCPs, to the PSTN. Each SCP is identified by a signaling point code, SPC, often referred to as simply the point code. The SCPs often were essentially databases needed, for example, to convert an 800 number to a standard phone number which a switch can use to make the desired connection. When a switch received an 800 number, it would simply forward the SS7 message to the point code of the SCP providing 800 service. The SCP would look up the standard phone number and, using an SS7 message, return it to the switch which then completed the call.

As the number and complexity of telephone services increased, the SCPs were upgraded to include more intelligence. Many SCPs now are computer servers and the services or functions are controlled entirely by computer programs. An intelligent SCP may be variously referred to as an intelligent network server, INS, an intelligent peripheral, IP, or a services node, SN. An intelligent SCP typically contains a number of functions or services which all therefore are identified by the same point code. Each service application is also identified by a subsystem number, SSN. A SS7 message to a particular network service therefore contains both the point code and a SSN. All of the SCPs follow the SS7 protocol so that messages can be sent to and from any of the subsystems at any of the point codes in the PSTN.

FIG. 1 illustrates the interconnection of various components of the PSTN and the SS7 system involved in a 911 call from a mobile phone 10. The radio signal from mobile phone 10 is received by a base station controller, BSC, 12. The SS7 control signals from BSC 12 are coupled through one or more signaling transfer points, such as STP 14, to a mobile switching center, MSC, 16. When the MSC 16 recognizes that the call is a 911 call, it forwards the SS7 message through STP 18 to service control point, SCP, 20 which includes a 911 subsystem 22. The 911 subsystem 22 performs various functions, including sending caller identification and, if available, location information to the police end point, and sending a message back through STP 18 to MSC 16 to connect the voice channel to the police department 24. The 911 subsystem 22 also notes that the call is from a mobile phone and sends a SS7 message over the SS7 network to a position determination entity, PDE, 26 also contained in SCP 20. The PDE 26 may then obtain information from the sending telephone 10 by exchanging SS7 messages through STP 18, MSC 16, STP 14 and BSC 12 and calculate the location of phone 10. If the PDE 26 can locate the phone 10, it sends an SS7 message with the location information to the 911 service application 22 which then forwards the information to the police department. In FIG. 1, a second SCP 28 is illustrated connected to the system through STP 14. The PDE subsystem could be located in SCP 28 instead of SCP 20. Since the message from 911 service 22 to the PDE service is sent over the SS7 network, it will get to the PDE service regardless of which SCP contains the service. The SCP 28 may also contain one or more other subsystems.

When multiple applications are needed for a single call, the messages from one subsystem to another are sent over the SS7 system using the same protocol as all other SS7 messages. While this is a natural use of the SS7 system, it has several problems. For example, when a 911 application determines that the call originated from a mobile phone and that a message needs to be sent to a PDE, the SS7 message will have been partially processed. The standard processing of an SS7 message involves stripping off and processing one layer of the SS7 message stack at a time. By the time the processor gets to the point in the stack where it needs to contact another subsystem, it no longer has a complete SS7 message and must create a new one to be able to communicate with the other subsystem.

As noted above, multiple subsystems may reside at the same INS having the same point code. For example, the 911 and the PDE subsystems may both be located at the same point code, for example SCP 20 of FIG. 1. When the 911 subsystem 22 sends the message to the PDE subsystem 26, it may travel through one or more signaling transfer points 18 to a switch 16 and back through one or more signaling transfer points 18 to arrive at the same SCP 20 from which it was sent. It would be desirable to provide a more efficient system and methods for sending SS7 messages between subsystems on the PSTN.

BRIEF SUMMARY OF THE INVENTION

The problems noted above are solved in large part by a service control point including a processor in which at least one service operates and a SS7 control. The SS7 control module routes inbound messages to the appropriate service upon receipt and also routes outbound SS7 messages from the service. The SS7 module checks outbound messages to determine if the destination service is located to the same local node point code, and if it is, routes the message to the next service module internally. If the destination service is located at a different point code, the SS7 module sends the message to the SS7 network for conventional routing.

In one embodiment, the SS7 controller stores inbound SS7 messages in a memory. The message is preserved and updated as it is processed by a selected subsystem. The stored message is used to generate outbound messages.

In one embodiment, the service control point includes at least two processors, each containing at least one service. The processors are coupled by a bus and the SS7 module may internally route outbound messages directed to a service residing in another processor at the same point code over the bus.

BRIEF DESCRIPTION OF THE DRAWINGS

For a detailed description of the preferred embodiments of the invention, reference will now be made to the accompanying drawings in which:

FIG. 3 is a flow chart illustrating a method of operation of the present invention.

NOTATION AND NOMENCLATURE

Figure 1:
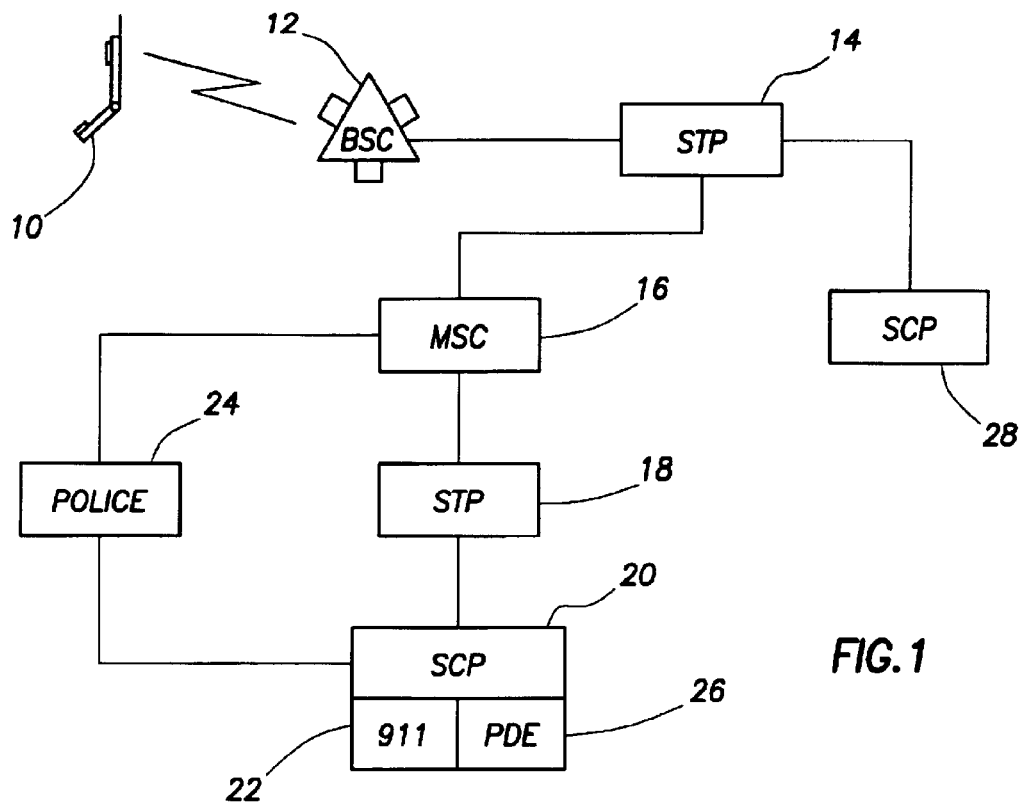
FIG. 1 is a block diagram of a portion of the PSTN illustrating SS7 signal flow in a 911 call from a mobile telephone.

Certain terms are used throughout the following description and claims to refer to particular system components. As one skilled in the art will appreciate, computer companies may refer to a component by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

As discussed above, FIG. 1 illustrates a portion of the PSTN which is used in making 911 calls and locating a mobile phone 10. All signaling signals between elements of the PSTN employ the standard SS7 protocol and signal paths. Thus, even when 911 service 22 and PDE service 26 reside in the same SCP 20 or even in the same processor in SCP 20, messages between the two require routing over the SS7 network. In the present invention, such messages are routed internally within the SCP, thereby reducing latency, i.e. the time to complete a requested function, and reducing the load on the SS7 network.

The conventional method of routing the messages to and from the same SCP over the SS7 network has been used for several reasons. The first is simply that all SS7 elements are designed to communicate that way. It is therefore a simple choice to continue operating that way. But of more importance is the fact that standard methods of processing received SS7 messages in a subsystem, e.g. 911 service 22, results in a deconstruction or loss of portions of the SS7 message stack as each layer is processed. By the time one service, e.g. 911 service 22, reaches the point where it knows it needs to call another service, e.g. PDE service 26, a complete SS7 message stack no longer exists. A new message must be constructed, and the only way in existing systems to do that requires sending a message back through the network.

Figure 2:
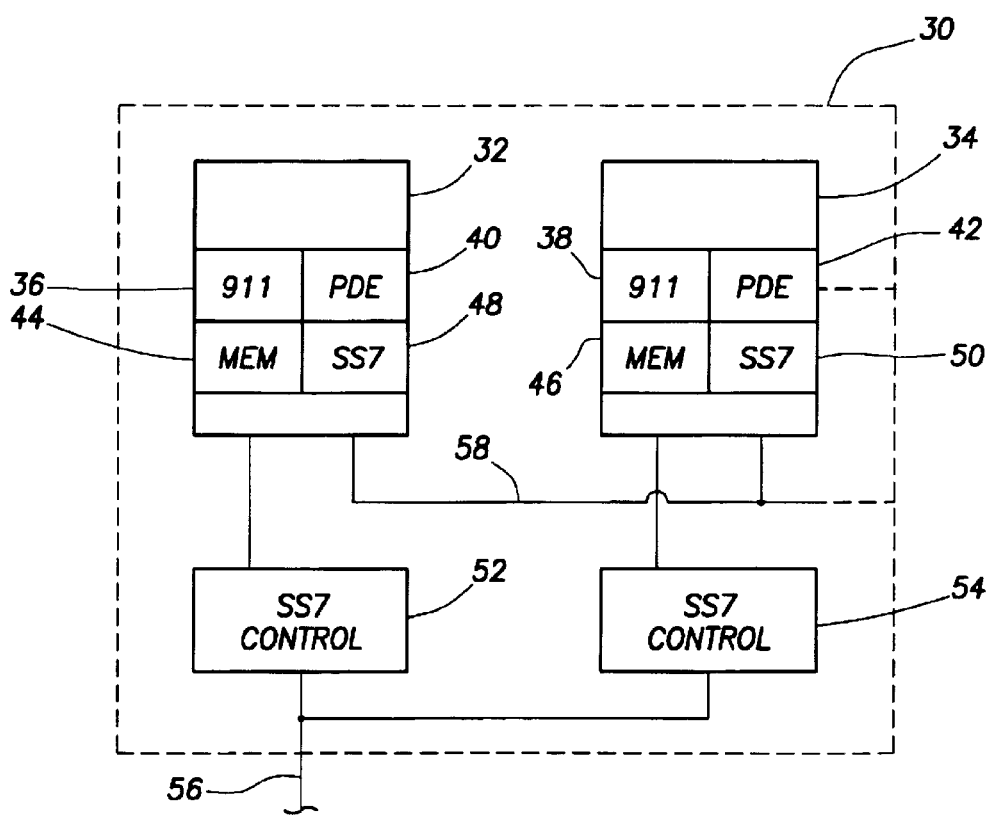
FIG. 2 is a block diagram of a service control point according to the present invention.

FIG. 2 illustrates a new structure of a SS7 system service control point or intelligent network server, INS, 30. In the preferred embodiment, the INS 30 comprises a Himalaya system manufactured by the Compaq Computer Corporation. The INS 30 includes a plurality of processors, with only two processors 32 and 34 shown to simplify the figure. Each processor 32, 34 may operate a plurality of functions or services such as 911 service 36, 38 and PDE service 40, 42. As illustrated, each service is typically replicated on multiple processors for fault tolerance and other purposes. Each processor 32, 34 includes a memory 44, 46 and a SS7 control module 48, 50. The INS 30 also includes a SS7 control card 52, 54 for each processor 32, 34. The control cards 52, 54 couple SS7 messages between the PSTN network 56 and the processors 32, 34. An internal bus 58 couples signals between each of the processors 32, 34 and all other processors within INS 30. In the preferred embodiment, the bus 58 is a ServerNet bus and includes at least two physical busses for fault tolerance and other purposes.

The INS 30 will be further described with reference to the above described interaction or collaboration between a 911 service and a PDE service in response to a mobile 911 call, as shown in FIG. 1. In response to a 911 call from mobile telephone 10, the MSC 16 sends an SS7 message to 911 service 36 in processor 32 of INS 30. As indicated above, the message includes point code identifying INS 30 and a SSN identifying 911 subsystem or service 36. This message is routed over the SS7 network 56 and is received by SS7 controllers 52, 54. Controllers 52, 54 couple the complete SS7 messages or stack to processors 32, 34 where it is stored in memories 44, 46. Upon receipt of the message, the SS7 modules 48, 50 determine whether it is directed to a process or service within its processor 32, 34. In this case SS7 module 48 routes the message to 911 subsystem 36, which is the service identified by SSN in the message.

When 911 subsystem 36 receives the SS7 message, it begins performing its functions. These functions add value to the original SS7 message, and the message stored in memory 44 is updated or changed to include the new information provided by 911 service 36.

At some point in the processing of the SS7 message, the 911 subsystem 36 will determine that it needs additional services from a PDE system, because the call came from a mobile telephone. At that point, a SS7 message needs to be sent to a selected PDE subsystem. Since the complete SS7 message has been preserved, in its updated form, in memory 44, an appropriate SS7 message stack is readily available. The 911 subsystem 36 then adds the SSN of a PDE service to the message and requests the SS7 module to route the message back out to the SS7 network and to the selected SSN. The Selected SSN could identify either of the PDE subsystems 40 or 42 or could identify a PDE service in a SCP other than SCP 30.

We will first consider the case where the 911 service has selected one of PDE services 40 and 42. When SS7 module 48 receives the outbound SS7 message from 911 subsystem 36, it checks the destination SSN against a standard SS7 routing table stored in memory 44. The routing table contains a list of all SS7 SSNs and the point code at which each SSN resides. In the present example, the SS7 module 48 will note that the point code is the same as the point code for 911 subsystem 36. The SS7 module 48 then simply changes the SS7 message to indicate that it is an inbound message, instead of an outbound message, and routes it to the selected SSN. If the PDE 40 was the selected SSN, the routing is simply within processor 32 in exactly the same manner as would occur if the message had been received over the network 56. If the PDE 42 was the selected SSN, the SS7 module will use the internal bus 58 to route the message to SS7 control module 50, which will then treat it as it would any other incoming message and route it to PDE 42.

It is possible that the 911 subsystem 36 will direct its outbound PDE request to a PDE subsystem at another SCP. In that case, the SS7 module 48 simply routes the message through SS7 control card 52 to the network 56, through which it will be routed to the correct SCP and SSN. While this routing is similar to the prior art methods, the present invention provides an improvement. Since the SS7 message was preserved in memory 44, the latency of the operation is improved. That is, the system does not have to build a new message.

It would be expected that an INS 30 which contains a 911 subsystem would also contain a PDE subsystem because the two would often be used together as discussed herein. However, there was no efficiency benefit in prior systems when both of these services were in the same SCP. The routing between the systems always went out over the network and back to the same point code. In view of the present invention, it is now preferred that subsystems that are often used together, or in collaboration, be grouped in the same SCP. Such an architecture, including the present invention, improves overall system performance by removing messages between SSNs from the network and reducing the latency of processes which use more than one subsystem.

The present invention operates in the same way when PDE 40 or 42 needs to send results of its processing back to 911 subsystem 36. If PDE 40 was selected, it will send its outbound SS7 message to SS7 module 48 to be routed to 911 subsystem 36. The SS7 message or stack, as updated by PDE subsystem 40, remains stored in the memory 44 shared by both 911 subsystem 36 and PDE subsystem 40. A complete SS7 message is therefore available for sending. Module 48 will again perform the routing table check and find that source and destination point codes match. It will then convert the outbound message to an inbound message and route it to 911 subsystem 36 internally.

If PDE 42 was the one selected by 911 subsystem 36, then the outbound message is sent to SS7 module 50 which performs the routing table check. SS7 module 50 will then route the message through the bus 58 to SS7 module 48 which will in turn route the message to 911 subsystem 36.

While the present invention has been described with reference to 911 and PDE subsystems, it applies equally to any other sets of subsystems which are used on the same telephone call. For example, an 800 call will use a 800 subsystem to determine the correct routing for the call, and will also use a billing subsystem which charges the call to the appropriate account.

With reference to FIG. 3, a flow chart is provided to illustrate operation of the present invention more generally. Two dashed line boxes 60 and 62 contain flow charts corresponding to functions performed by two separate processors or CPUs residing in the same INS or SCP. The functions of processor 60 will be described first. The process begins when an inbound SS7 message is received from the network at step 64. The message is sent to a memory device and to a SS7 control module at step 66. At step 66, the message is checked to see if its destination is a subsystem in this processor. In this example, it is assumed that the processor has two subsystems, SS1 and SS2. In actual INSs, each processor normally has a larger number of subsystems. Assuming that the destination subsystem is SS1, the received message is sent to SS1 at step 68. At step 70, SS1 processes the message, i.e. provides the requested service. At step 72, SS1 sends an outbound message which includes the SSN for another network device. At step 74, the outbound message point code for that SSN is checked by the SS7 control module. If the point code if not for this INS, the message is sent to the network at step 76. If the point code is the same as the point code of this INS, the outbound message is routed internally at step 78.

As shown in FIG. 3, the steps involved in processing an inbound SS7 message received from the network with either subsystem SS2 in processor 60 or with a subsystem, SS3, in processor 62 is identical to the processing described above.

If the message from SS1 at step 72 is routed internally, step 78, there are two possible internal routings in this example. If the destination is SS2, then the message is routed to the processing step for SS2. This corresponds to the FIG. 2 example where SS1 may be a 911 service and SS2 may be a PDE service called by the 911 service. During or at completion of step 80, one or more messages may be sent by SS2 at step 82. At step 84, the point code for the destination subsystem is checked just as was done in step 74. In the 911/PDE example given above, the PDE process includes one or more communications with the sending telephone to obtain information to locate the telephone. Each of these messages will have a destination point code different from the INS, and at step 84 will be routed as outbound messages to the network at step 86.

When the processing at step 80 is completed, the outbound message at step 82 may be directed back to SS1 which made the initial service request. In that case the point code would match this INS at step 84 and the message would be routed internally at step 88. The internal routing would send the message to step 70, where SS1 would perform further processing. In the 911/PDE example, SS1 may then complete it's processing and send an outbound message, step 72, to the network at step 76.

If an outbound message from SS1 is to be routed internally to SS3 in processor 62, the routing steps are slightly different. In this case the message would go to step 90, where the SS7 control module of processor 62 would treat it as in incoming message and route it to SS3 at step 92. In the 911/PDE example, SS3 may be the PDE service and the remaining steps would be as described above. However, if an outbound message from SS3 is to be internally routed at step 94 back to a processor 60 subsystem, the routing is to step 66.

In each of the internal routing steps 78, 88 and 94, the process of internal routing includes a change in the SS7 message to indicate that it is an incoming message. In this way, the next step is performed as if it was a message received from the network, e.g. at step 64. The fact that the inbound SS7 messages received from the network are stored in the processor memories at steps 66 and 90 makes it possible for the subsystems, e.g. SS1, SS2, SS3, to send a complete SS7 message without routing over the network itself. The systems which receive, route and process the SS7 messages may therefore operate on the internally routed messages in the same manner as they do with messages actually received over the network.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A public switched telephone network service control point comprising:
   a first subsystem;
   a second subsystem;
   a signaling system seven (SS7) control module coupled to the first subsystem and the second subsystem, the module receiving an outbound signaling system seven (SS7) message from the first subsystem and, if the destination for the outbound message is the second subsystem, internally converting the outbound message to an inbound signaling system seven (SS7)-message and internally routing the inbound signaling system seven (SS7) message to the second subsystem;
   whereby, the outbound message from the first subsystem is routed to the second subsystem without being routed over a signaling system seven (SS7) network.

2. The public switched telephone network service control point of claim 1 wherein:
   the signaling system seven (SS7) control module checks the destination of the outbound message and then internally converts the message into an inbound message.

3. The public switched telephone network service control point of claim 2 wherein:
   the signaling system seven (SS7) control module checks the destination of the outbound message by checking the destination signaling point code contained in the outbound message.

4. The public switched telephone network service control point of claim 1 further comprising:
   a memory storing an inbound signaling system seven (SS7) message.

5. The public switched telephone network service control point of claim 1 further comprising;
   a computer processor in which said first and second subsystems and said signaling system seven (SS7) control module operate.

6. The public switched telephone network service control point of claim 1 further comprising;
   a first computer processor in which said first subsystem and said signaling system seven (SS7) control module operate, and
   a second computer processor in which said second subsystem and said signaling system seven (SS7) control module operate.

7. A public switched telephone network comprising: a service control point,
   a plurality of subsystems operating in the service control point, and
   means for internally routing an outbound signaling system seven (SS7) message from a first subsystems in the service control point to a second subsystems in the same service control point, the second system being designated as a destination subsystem in the outbound message, without routing the outbound signaling system seven (SS7) message over a signaling system seven (SS7) network.

8. The public switched telephone network according to claim 7 wherein:
   said subsystems residing in the service control point are selected to maximize the likelihood that outbound signaling system seven (SS7) messages from a subsystem will have another subsystem in the same service control point as the destination subsystem.

9. The public switched telephone network according to claim 8 further comprising:
   a 911 service subsystem and a position determining entity subsystem residing at the same service control point.

10. A method for managing signaling system seven (SS7) messages in a public switched telephone network service control point having a plurality of subsystems comprising:
    checking the destination subsystem identified in an outbound signaling system seven (SS7) message and, if the destination subsystem resides in the same service control point, internally rerouting the message to the destination subsystem without routing the outbound signaling system seven (SS7) message over a signaling system seven (SS7) network.

11. The method of claim 10 further comprising:
    comparing the signaling point code of the destination subsystem to the signaling point code of the subsystem sending the outbound message.

12. The method of claim 11 further comprising:
    using a routing table to determine the signaling point code of the outbound message based on the subsystem number of the destination subsystem.

13. The method of claim 10 further comprising:
    internally converting the outbound message to an inbound message.

14. A method for managing signaling system seven (SS7) messages in a public switched telephone network service control point having at least two subsystems comprising:
    coupling an inbound signaling system seven (SS7) message to a memory in the service control point and to a first subsystem in the same service control point designated as the destination subsystem in the inbound message,
    processing said inbound signaling system seven (SS7) message with said first subsystem and updating the message stored in said memory to include the results of said processing,
    using the stored and updated message to send an outbound signaling system seven (SS7) message from said first subsystem in the service control point to a second subsystem, and
    comparing the network location of said first subsystem to the network location of said second subsystem, and if said locations are the same, internally routing said outbound signaling system seven (SS7) message to said second subsystem without routing the outbound signaling system seven (SS7) message over a signaling system seven (SS7) network.

15. The method of claim 14 further comprising:
    using a routing table to identify the signaling point code of said second subsystem.

16. The method of claim 14 further comprising:
    internally converting said outbound message to an inbound message.

* * * * *